United States Patent [19]

Damashek

[11] Patent Number: 5,418,951
[45] Date of Patent: May 23, 1995

[54] METHOD OF RETRIEVING DOCUMENTS THAT CONCERN THE SAME TOPIC

[75] Inventor: Marc Damashek, Hampstead, Md.

[73] Assignee: The United States of America as represented by the Director of National Security Agency, Washington, D.C.

[21] Appl. No.: 316,495

[22] Filed: Sep. 30, 1994

Related U.S. Application Data

[63] Continuation of Ser. No. 932,522, Aug. 20, 1992, abandoned.

[51] Int. Cl.⁶ ............................................. G06F 7/00
[52] U.S. Cl. ............................. 395/600; 364/DIG. 1; 364/DIG. 2
[58] Field of Search ................ 395/600; 364/DIG. 1, 364/DIG. 2

[56] References Cited

U.S. PATENT DOCUMENTS

| | | | |
|---|---|---|---|
| 4,754,489 | 8/1988 | Bokser | 382/40 |
| 5,031,206 | 7/1991 | Riskin | 379/97 |
| 5,062,143 | 10/1991 | Schmitt | 382/36 |
| 5,150,425 | 9/1992 | Martin et al. | 382/14 |
| 5,182,708 | 1/1993 | Ejiri | 364/419 |
| 5,251,131 | 10/1993 | Massand et al. | 364/419.08 |
| 5,276,741 | 1/1994 | Aragon | 382/40 |
| 5,293,466 | 3/1994 | Bringmann | 395/114 |

Primary Examiner—Thomas G. Black
Assistant Examiner—Jean R. Homere
Attorney, Agent, or Firm—Thomas O. Maser; Robert D. Morelli

[57] ABSTRACT

A method of identifying, retrieving, or sorting documents by language or topic involving the steps of creating an n-gram array for each document in a database, parsing an unidentified document or query into n-grams, assigning a weight to each n-gram, removing the commonality from the n-grams, comparing each unidentified document or query to each database document, scoring the unidentified document or query against each database document for similarity, and based on the similarity score, identifying retrieving, or sorting the document or query with-respect to language or topic.

10 Claims, 11 Drawing Sheets

GREENLANDIC LANGUAGE REFERENCE: NANOK_NUANE_ISSIGTUNE

| UNIQUE 2-GRAMS | FREQUENCY OF OCCURRENCE | WEIGHT |
|---|---|---|
| NA | 2 | (2/21) = 0.095 |
| AN | 2 | 0.095 |
| NO | 1 | 0.048 |
| OK | 1 | 0.048 |
| K_ | 1 | 0.048 |
| _N | 1 | 0.048 |
| NU | 1 | 0.048 |
| UN | 2 | 0.095 |
| NE | 2 | 0.095 |
| E_ | 1 | 0.048 |
| _I | 1 | 0.048 |
| IS | 1 | 0.048 |
| SS | 1 | 0.048 |
| SI | 1 | 0.048 |
| IG | 1 | 0.048 |
| GT | 1 | 0.048 |
| TU | 1 | 0.048 |
|  | 21 |  |

FIG. 3

HAWAIIAN LANGUAGE REFERENCE: I_HELE_MAI_NEI_AU_E_HAI

| UNIQUE 2-GRAMS | FREQUENCY OF OCCURRENCE | WEIGHT |
|---|---|---|
| I_ | 3 | (3/22) = 0.136 |
| _H | 2 | 0.091 |
| HE | 1 | 0.045 |
| EL | 1 | 0.045 |
| LE | 1 | 0.045 |
| E_ | 2 | 0.091 |
| _M | 1 | 0.045 |
| MA | 1 | 0.045 |
| AI | 2 | 0.091 |
| _N | 1 | 0.045 |
| NE | 1 | 0.045 |
| EI | 1 | 0.045 |
| _A | 1 | 0.045 |
| AU | 1 | 0.045 |
| U_ | 1 | 0.045 |
| _E | 1 | 0.045 |
| HA | 1 | 0.045 |
| | 22 | |

FIG. 4

COMMONALITY WEIGHTS FOR 2-GRAMS WITHIN REFERENCE DOCUMENTS

| UNIQUE 2-GRAMS | GREENLANDIC WEIGHT | HAWAIIAN WEIGHT | COMMONALITY WEIGHT |
|---|---|---|---|
| NA | 0.095 | 0.0 | (0.095 + 0) / 2 = 0.048 |
| AN | 0.095 | 0.0 | 0.048 |
| NO | 0.048 | 0.0 | 0.024 |
| OK | 0.048 | 0.0 | 0.024 |
| K_ | 0.048 | 0.0 | 0.024 |
| _N | 0.048 | 0.045 | 0.047 |
| NU | 0.048 | 0.0 | 0.024 |
| UN | 0.095 | 0.0 | 0.048 |
| NE | 0.095 | 0.045 | 0.070 |
| E_ | 0.048 | 0.091 | 0.070 |
| _I | 0.048 | 0.0 | 0.024 |
| IS | 0.048 | 0.0 | 0.024 |
| SS | 0.048 | 0.0 | 0.024 |
| SI | 0.048 | 0.0 | 0.024 |
| IG | 0.048 | 0.0 | 0.024 |
| GT | 0.048 | 0.0 | 0.024 |
| TU | 0.048 | 0.0 | 0.024 |
| I_ | 0.0 | 0.136 | 0.068 |
| _H | 0.0 | 0.091 | 0.046 |
| HE | 0.0 | 0.045 | 0.023 |
| EL | 0.0 | 0.045 | 0.023 |
| LE | 0.0 | 0.045 | 0.023 |
| _M | 0.0 | 0.045 | 0.023 |
| MA | 0.0 | 0.045 | 0.023 |
| AI | 0.0 | 0.091 | 0.046 |
| EI | 0.0 | 0.045 | 0.023 |
| _A | 0.0 | 0.045 | 0.023 |
| AU | 0.0 | 0.045 | 0.023 |
| U_ | 0.0 | 0.045 | 0.023 |
| _E | 0.0 | 0.045 | 0.023 |
| HA | 0.0 | 0.045 | 0.023 |

FIG. 5

COMMONALITY-REMOVED WEIGHTS FOR GREENLANDIC REFERENCE DOCUMENT

| UNIQUE 2-GRAMS | GREENLANDIC WEIGHT | COMMONALITY WEIGHT | COMMONALITY-REMOVED WEIGHT |
|---|---|---|---|
| NA | 0.095 | 0.048 | (0.095 - 0.048) = 0.047 |
| AN | 0.095 | 0.048 | 0.047 |
| NO | 0.048 | 0.024 | 0.024 |
| OK | 0.048 | 0.024 | 0.024 |
| K_ | 0.048 | 0.024 | 0.024 |
| _N | 0.048 | 0.047 | 0.001 |
| NU | 0.048 | 0.024 | 0.024 |
| UN | 0.095 | 0.048 | 0.047 |
| NE | 0.095 | 0.070 | 0.025 |
| E_ | 0.048 | 0.070 | -0.022 |
| _I | 0.048 | 0.024 | 0.024 |
| IS | 0.048 | 0.024 | 0.024 |
| SS | 0.048 | 0.024 | 0.024 |
| SI | 0.048 | 0.024 | 0.024 |
| IG | 0.048 | 0.024 | 0.024 |
| GT | 0.048 | 0.024 | 0.024 |
| TU | 0.048 | 0.024 | 0.024 |

FIG. 6

COMMONALITY-REMOVED WEIGHTS FOR HAWAIIAN REFERENCE DOCUMENT

| UNIQUE 2-GRAMS | HAWAIIAN WEIGHT | COMMONALITY WEIGHT | COMMONALITY-REMOVED WEIGHT |
|---|---|---|---|
| I_ | 0.136 | 0.068 | (0.136 - 0.068) = 0.068 |
| _H | 0.091 | 0.046 | 0.045 |
| HE | 0.045 | 0.023 | 0.022 |
| EL | 0.045 | 0.023 | 0.022 |
| LE | 0.045 | 0.023 | 0.022 |
| E_ | 0.091 | 0.070 | 0.021 |
| _M | 0.045 | 0.023 | 0.022 |
| MA | 0.045 | 0.023 | 0.022 |
| AI | 0.091 | 0.046 | 0.045 |
| _N | 0.045 | 0.047 | -0.002 |
| NE | 0.045 | 0.070 | -0.035 |
| EI | 0.045 | 0.023 | 0.022 |
| _A | 0.045 | 0.023 | 0.022 |
| AU | 0.045 | 0.023 | 0.022 |
| U_ | 0.045 | 0.023 | 0.022 |
| _E | 0.045 | 0.023 | 0.022 |
| HA | 0.045 | 0.023 | 0.022 |

FIG. 7

UNIDENTIFIED DOCUMENT: MARTSIME_NANUT

| UNIQUE 2-GRAMS | FREQUENCY OF OCCURRENCE | WEIGHT | COMMONALITY | COMMONALITY-REMOVED WEIGHT |
|---|---|---|---|---|
| MA | 1 | (1 / 13) = 0.077 | 0.023 | 0.054 |
| AR | 1 | 0.077 | 0.0 | 0.077 |
| RT | 1 | 0.077 | 0.0 | 0.077 |
| TS | 1 | 0.077 | 0.0 | 0.077 |
| SI | 1 | 0.077 | 0.024 | 0.053 |
| IM | 1 | 0.077 | 0.0 | 0.077 |
| ME | 1 | 0.077 | 0.0 | 0.077 |
| E_ | 1 | 0.077 | 0.070 | 0.007 |
| _N | 1 | 0.077 | 0.047 | 0.030 |
| NA | 1 | 0.077 | 0.048 | 0.029 |
| AN | 1 | 0.077 | 0.048 | 0.029 |
| NU | 1 | 0.077 | 0.024 | 0.053 |
| UT | 1 | 0.077 | 0.0 | 0.077 |
| | 13 | | | |

FIG. 8

$$\text{SCORE} = \frac{\sum_{i=1}^{n}(U_i \times R_i)}{\sqrt{\sum_{i=1}^{n}U_i^{}2 \times \sum_{i=1}^{n}R_i^{}2}}$$

$$\text{SCORE} = \frac{\begin{array}{l}(0.054 \times 0) + (0.077 \times 0) + (0.077 \times 0) + (0.077 \times 0) + \\ (0.053 \times 0.024) + (0.077 \times 0) + (0.077 \times 0) + \\ (0.007 \times (-0.022)) + (0.030 \times 0.001) + (0.029 \times 0.047) + \\ (0.029 \times 0.047) + (0.053 \times 0.024) + (0.077 \times 0)\end{array}}{\sqrt{\begin{array}{l}((0.054^{}2) + (0.077^{}2) + (0.077^{}2) + (0.077^{}2) + \\ (0.053^{}2) + (0.077^{}2) + (0.077^{}2) + (0.007^{}2) + \\ (0.030^{}2) + (0.029^{}2) + (0.029^{}2) + (0.053^{}2) + \\ (0.077^{}2)) \times ((0.047^{}2) + (0.047^{}2) + (0.024^{}2) + \\ (0.024^{}2) + (0.024^{}2) + (0.001^{}2) + (0.024^{}2) + \\ (0.047^{}2) + (0.025^{}2) + ((-0.022)^{}2) + (0.024^{}2) + \\ (0.024^{}2) + (0.024^{}2) + (0.024^{}2) + (0.024^{}2) + \\ (0.024^{}2) + (0.024^{}2))\end{array}}}$$

FIG. 9

METHOD OF RETRIEVING DOCUMENTS THAT CONCERN THE SAME TOPIC

This Application is a Continuation of U.S. patent application Ser. No. 07/932,522, filed Aug. 20, 1992, which is now abandoned.

BACKGROUND OF THE INVENTION

1. Field of the Invention

This invention relates to a document retrieval method, and more particularly to a document retrieval method capable of full text searching without the need for keyword or context-based information. This method can be used to identify, retrieve, and sort documents by topic or language. This method is also useful for identifying, retrieving, and sorting any form of communication such as acoustic signals (e.g., speech) and graphic symbols (e.g., pictures) that can be represented in machine readable format.

2. Description of Related Art

In "DARPA Eyes Smart Text Sifters", a published article by R. Colin Johnson in *Electronic Engineering Times*, Feb. 17, 1992, pp. 35 it was indicated that extensive research efforts have been expended to find better ways of searching textual databases in order to retrieve documents of concern to the user. It was indicated that several fundamental problems stand in the way of realizing any meaningful breakthroughs.

One technique to improve searches has been to create specialized hardware that can process information faster. The problem with this approach is that the improvements in processing speed have not kept pace with the rate at which database information has expanded. It was mentioned that a fundamental theoretical breakthrough was required to improve the way information is retrieved from large databases.

Conventional information retrieval systems are still based on using keywords or phrases with operators (e.g., and, or, not) to identify documents of interest. The problem with this technique is that documents may contain a synonym of the keyword rather than the keyword itself (e.g., car vs. automobile), or an inflected form of the keyword (e.g., retrieving vs. retrieve). Such systems are typically sensitive to spelling or data-transmission errors at the input. The operators may also be difficult to use. Additional problems include identifying appropriate keywords, identifying appropriate synonyms, and retrieving either insufficient, voluminous and/or extraneous documents. Typically an extensive table of synonyms is used to mitigate these problems. But this method increases memory requirements and slows processing time.

Another problem with keyword searches is that the meaning of the keyword usually depends on the context in which it is used. Therefore without some indication of the desired context of the keyword, the chances of retrieving unwanted documents are great. Prior approaches to document retrieval have attempted to overcome this problem by adding contextual information to the search using techniques such as context vectors, conceptual graphs, semantic networks, and inference networks. These techniques also increase memory requirements and slow processing time. Adding context information is also a task requiring significant time of a trained individual.

In "Global Text Matching for Information Retrieval", a published article by G. Salton and C. Buckley in *Science*, Vol. 253, Aug. 30, 1991, pp. 1012–1015, it has been indicated that text analysis using synonyms is cumbersome and that text analysis using a knowledge-based approach is complex. This same article indicates that text understanding must be based on context and the recognition of text portions (i.e., sections of text, paragraphs or sentences).

In "Developments in Automatic Text Retrieval", a published article by G. Salton in *Science*, Vol. 253, Aug. 30, 1991, pp. 974–980, the present state of document retrieval is summarized. It indicates that text analysis is a problem because there is a need to retrieve only documents of interest from large databases. The typical solution to this problem has been to generate content identifiers. This has been done because the meaning of a word cannot adequately be determined by consulting a dictionary without accounting for the context in which the word is used. It was indicated that the words in the text can also be used for context identification. Such retrieval systems are defined as full text retrieval systems.

In "N-gram Statistics for Natural Language Understanding and Text Processing", a published article by C. Suen in *IEEE Transactions On Pattern Analysis and Machine Intelligence*, Vol. PAMI-1, No. 2, April 1979, two methods of processing natural language were described, one using keywords and a dictionary and one using n-grams. In the keyword approach, words are compared. In the n-gram approach, strings of letters are compared. Comparing strings of letters is faster and requires less memory than a keyword and dictionary method.

In U.S. Pat. No. 5,020,019, entitled "Document Retrieval System", a system is described that searches documents using keywords with a learning feature that allows the user to assign weight to the different keywords in response to the result of a previous search. The present invention does not use a keyword approach.

In U.S. Pat. No. 4,985,863, entitled "Document Storage and Retrieval", a method is described where documents are stored in sections. Sections of text, rather than keywords, are then used to retrieve similar documents. The present invention does not a keyword or sectioning approach.

In U.S. Pat. No. 4,849,898, entitled "Method and Apparatus to Identify the Relation of Meanings Between Words in Text Expressions", a method is described that uses a letter-semantic analysis of keywords and words from a document in order to determine whether these words mean the same thing. This method is used to retrieve documents or portions of documents that deal with the same topic as the keywords. The present invention does not use semantic analysis.

In U.S. Pat. No. 4,823,306, entitled "Text Search System", a method is described that generates synonyms of keywords. Different values are then assigned to each synonym in order to guide the search. The present invention does not generate synonyms.

In U.S. Pat. No. 4,775,956, entitled "Method and System for Information Storing and Retrieval Using Word Stems and Derivative Pattern Codes Representing Families of Affixes", a method is described that uses a general set of affixes that are used to modify each keyword stem. This method reduces memory requirements that would otherwise be needed to store the synonyms of each keyword. The present invention does not modify keyword stems.

In U.S. Pat. No. 4,358,824, entitled "Office Correspondence Storage and Retrieval System", a method is described that reduces documents to abstracts by recording the keywords used in each document. Keywords are then used to search for the documents of interest. The present invention does not replace the text of stored documents with keyword abstracts.

SUMMARY OF THE INVENTION

It is an object of this invention to provide a method of identifying the language that a given document is written in.

It is another object of this invention to provide a method of retrieving documents, in a particular language, from a database by topic.

It is another object of this invention to provide a method of sorting documents in a database by language.

It is another object of this invention to provide a method of sorting documents in a database by topic.

These objects are achieved by a new approach to document identification, retrieval, and sorting. The term documents refers to machine readable text, speech or graphics. The present invention uses a pattern recognition technique based on n-gram comparisons among documents instead of the traditional keyword or context-based approach. The removal of commonality among database documents provides sensitive discrimination among documents while allowing for a reduction in memory requirements (as compared with keyword and dictionary methods) and an increase in performance. The user can set the threshold used to determining whether documents are similar.

BRIEF DESCRIPTION OF THE DRAWINGS

FIG. 3 is a sample reference document for the Greenlandic language showing all the unique 2-grams, the frequency of occurrence of each 2-gram, and the weight of each 2-gram;

FIG. 4 is a sample reference document for the Hawaiian language showing all the unique 2-grams, the frequency of occurrence of each 2-gram, and the weight of each 2-gram;

FIG. 5 is a list of all the unique 2-grams from the reference documents of FIG. 3 and FIG. 4, the weight for each 2-gram, and the commonality weight that each 2-gram exhibits within the reference documents;

FIG. 6 is a list of the commonality-removed weights for each unique 2-gram within the Greenlandic reference document;

FIG. 7 is a list of the commonality-removed weights for each unique 2-gram within the Hawaiian reference document;

FIG. 8 is a sample of an unidentified language showing all the unique 2-grams, the frequency of occurrence of each 2-gram, the weight of each 2-gram, and the commonality-removed weight of each 2-gram;

FIG. 9 shows the score of the unidentified text of FIG. 8 with respect to the Greenlandic reference document of FIG. 3;

DESCRIPTION OF PREFERRED EMBODIMENTS

The present invention describes a method for identifying, searching, and sorting documents. This method yields a sensitive, fast, and economical method for language identification, topic identification, document retrieval and document sorting. Throughout this specification and the accompanying claims, the term document will be used to refer to a set of information in machine readable format. The document may consists of text, speech or graphics.

The method of the present invention can be easily implemented in any programming language or in hardware to perform such difficult tasks as identifying topics of documents, even if these documents are written in ideographic languages such as Japanese. This method can also be used to sort documents in a database into like categories without the need for prior identification of the categories or the documents contained therein.

Instead of relying on keywords, synonym tables, or contextual information, the objects of the present invention are accomplished by a pattern recognition technique. The present invention is based upon the hypothesis that documents that are similar in language and/or topic look alike, in that they tend to contain many of the same n-grams (i.e., consecutive runs of n characters). They look alike not just in keywords but in all words used. This hypothesis suggests the rather startling conclusion that the topic of a document can reliably be deduced by enumerating the n-grams contained therein and comparing the result of that operation with the enumerated n-grams found in another ("reference") document.

This realization allows for simplifications in the search algorithm used to identify related documents. These simplifications result in the ability to classify documents regardless of the language in which they are written. A high error ("garble") rate in the original text is also tolerated. The maximum tolerable error rate for dissimilar languages is higher than the maximum tolerable error rate for similar languages. For example, the maximum tolerable error rate for Swahili text when compared against Swedish text may be as high as 25% without causing erroneous results whereas the maximum tolerable error rate for Russian text when compared against Czech text may only be as high as 15% without causing erroneous results.

Figure 1:
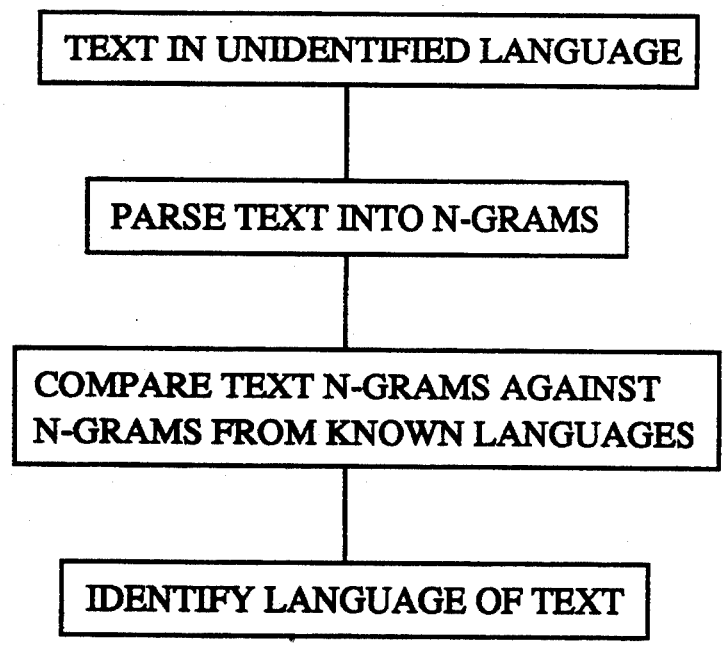
FIG. 1 is a flow chart of the language identification algorithm.

FIG. 1 outlines a language identification algorithm. The first step consists of parsing text, which is written in an unidentified language, into n-grams. N-grams are consecutive runs of n characters where n is any positive integer greater than zero. Moderately long n-grams (i.e., $n>3$) are typically more informative than shorter n-grams, as they tend to embody information about the roots of words present in the text. The second step is to compare the frequency of occurrence of the n-grams in the unidentified text with the frequency of occurrence of these same n-grams in the text of known languages. The unidentified text is then identified as being written in the language of the text with which the unidentified text best compares.

The allowable n-gram characters are defined by the user. For example, the n-gram elements for a particular language may be restricted to the letters of the alphabet for languages of interest and a space (i.e., "_"). Small letters may be converted to capital letters and multiple spaces can be reduced to a single space in order to reduce the total number of possible n-grams. Punctuation may also be ignored in order to minimize memory requirements, and enhance performance. Strings of characters may also be eliminated or replaced by a user-defined character or string of characters.

Figure 2:
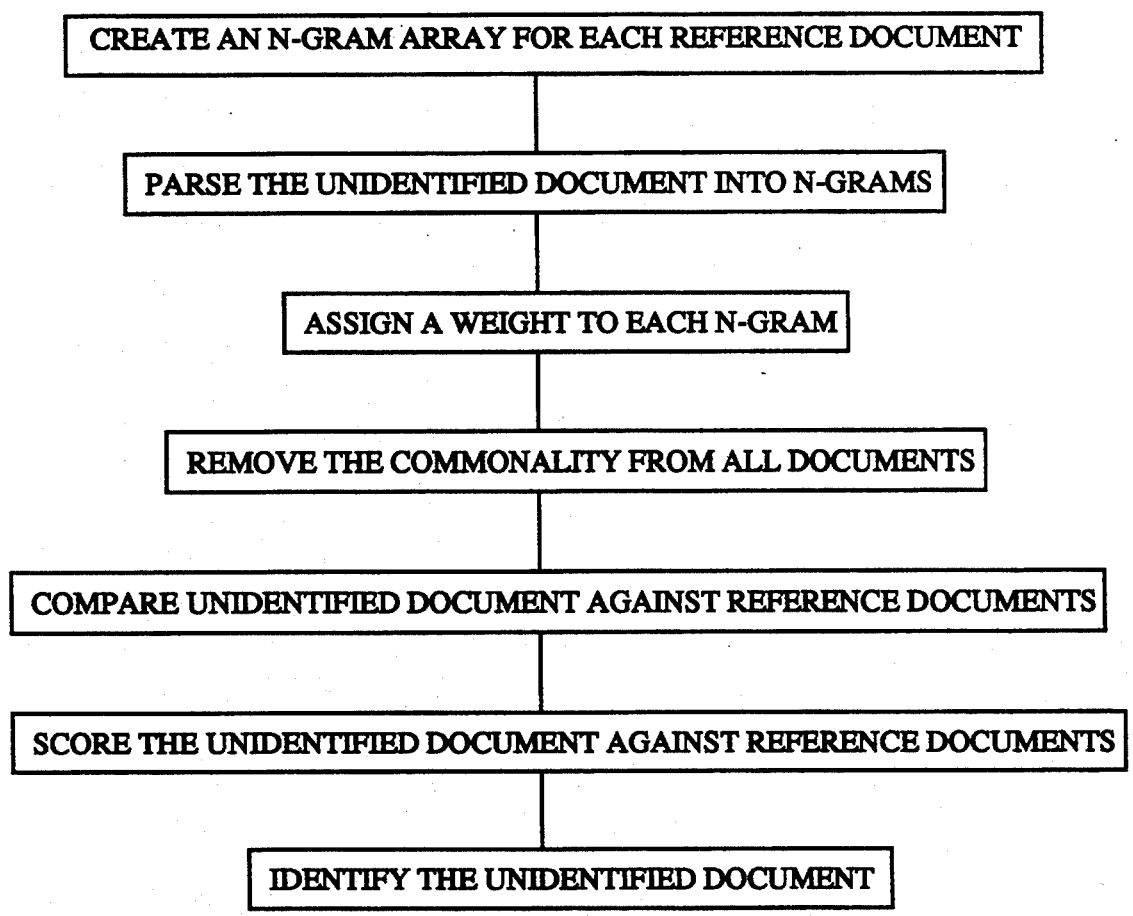
FIG. 2 is a flow chart of the identification algorithm for language and topic.

FIG. 2 outlines an algorithm that is useful for identifying the language, or topic of a document. A simple illustrative example of the major steps involved follows the description of the algorithm.

Known examples of text in different languages and topics are collected as reference documents. There is no restriction on the form that these reference documents may take. Sample text from any source can be used. The number of reference documents and n-grams contained in these documents must be statistically significant. It has been empirically determined that for language identification, approximately ten documents, each having approximately one-thousand characters, is a statistically significant sample size. For topic identification within a particular language, which is a finer distinction than language identification, approximately fifty documents, each having approximately one-thousand characters, is a statistically significant sample size.

The reference documents are parsed into n-grams. This is accomplished by making a separate list, for each reference document, of all the unique n-grams that occur in that reference document (where n is typically fixed at some value that is useful, such as n=5). The unidentified document is also parsed into a list of unique n-grams.

Weights are assigned to each unique n-gram. The weight is determined by the relative frequency of occurrence of that n-gram in that particular reference document (i.e., the number of times that an n-gram occurs in a particular reference document divided by the aggregate total of all n-gram occurrences within that reference document). Weights are assigned to each n-gram in each reference document and to each n-gram in the unidentified document.

The commonality among the reference documents is then removed from the reference documents as well as from the unidentified document. This is accomplished by first listing the unique n-grams among the reference documents. Second, a commonality weight is assigned to each unique reference document n-gram based on its mean relative frequency of occurrence (i.e., the sum of the individual weights for that one n-gram from all the reference documents divided by the total number of reference documents). The commonality weight of each n-gram is then subtracted from the weight of its corresponding n-gram within each reference document and from the weight of its corresponding n-gram within the unidentified document.

The unidentified document is then compared to each of the reference documents. This is accomplished by scoring the unidentified document against each of the reference documents. The score for the unidentified document with respect to a reference document indicates the degree of similarity between the two documents.

Scoring the unidentified document entails first, as mentioned above, subtracting the commonality weight derived from the reference documents from its corresponding n-gram weight within the unidentified document. If an n-gram appears in the unidentified document but does not appear in the reference documents the commonality weight for that n-gram is equal to zero. Each commonality-removed n-gram weight of the unidentified document (denoted Ui) is then multiplied by the commonality-removed n-gram weight of its corresponding n-gram in a particular reference document (denoted Ri). These products are then summed (i.e., "summation of products").

$$\text{summation of products} = \sum_{i=1}^{n} (Ui \times Ri)$$

Each commonality-removed n-gram weight in the reference document is then squared (i.e., Ri2). These squared terms are then summed. Each commonality-removed n-gram weight in the unidentified document is then squared (i.e., Ui2). These squared terms are also summed. These two sums are then multiplied together to form a "product of summations".

$$\text{product of summations} = \sum_{i=1}^{n} Ui^2 \times \sum_{i=1}^{n} Ri^2$$

Finally, the score of the unidentified document with respect to a particular reference document is the "summation of products" divided by the square root of the "product of summations".

$$\text{score} = \frac{\sum_{i=1}^{n} (Ui \times Ri)}{\sqrt{\sum_{i=1}^{n} Ui^2 \times \sum_{i=1}^{n} Ri^2}}$$

The unidentified document is scored against each of the reference documents. The user can define the score-threshold required for identifying a document as being similar to a reference document with respect to language or topic. When a user-defined threshold is used, there is a possibility that an unidentified document may not be identified as being similar to any of the reference documents. The user can avoid having to set this threshold by allowing the unidentified document to be identified with the reference document that produced the highest score.

The following examples demonstrate the numerical steps involved with the present invention. These examples are intended to be exemplary of the individual steps of the algorithm and should not be viewed as limitations upon the claimed invention.

FIG. 3 shows a reference document for the Greenlandic language (i.e., "Nanok nunane issigtune"). No preprocessing of the example is necessary. Two-grams will be used in this example. In order to reduce the number of possible 2-grams, the small letters will be capitalized and any multiple spaces will be reduced to a single space (i.e., "_"). The Greenlandic reference document thus becomes "NANOK_NUNANE_ISSIGTUNE".

All unique 2-grams for the Greenlandic reference document are shown in FIG. 3. They are NA, AN, NO, OK, K_, _N, NU, UN, NE, E_, _I, IS, SS, SI, IG, GT, TU. A weight is assigned to each of these 2-grams. The weight of a 2-gram is determined by dividing the frequency of occurrence of that particular 2-gram by the total number of (possibly non-unique) 2-grams present in the reference (i.e., the weight of the 2-gram NA is 2/21=0.095).

FIG. 4 shows a reference document for the Hawaiian language (i.e., "I hele mai nei au e hai"). All reference documents must be parsed using the same n-gram structure (e.g., 2-grams in this example). Again, in order to reduce the number of possible 2-grams, the small letters will be capitalized and multiple spaces will be reduced to a single space. The Hawaiian reference document thus becomes "I_HELE_MAI_NEI_AU_E_HAI".

All unique 2-grams for the Hawaiian reference document are shown in FIG. 4. They are I_, _H, HE, EL, LE, E_, _M, MA, AI, _N, NE, EI, _A, AU, U_, _E, HA. A weight is assigned to each 2-gram in the same manner as described for the Greenlandic reference document above (e.g., the weight of the 2-gram I_ is 3/22=0.136).

There is no requirement that the number of n-grams contained in the reference documents be similar. The algorithm requires no preprocessing of the documents. Even capitalization and the reduction of multiple spaces to a single space is not required for proper operation of the present invention. These steps are only taken in order to enhance performance and reduce memory requirements.

The commonality among the reference documents is then removed. This is accomplished by first listing all unique 2-grams within all of the reference documents as shown in FIG. 5 (i.e., NA, AN, NO, OK, K_, _N, NU, UN, NE, E_, _I, IS, SS, SI, IG, GT, TU, I_, _H, HE, EL, LE, _M, MA, AI, EI, _A, AU, U_, _E, HA). The commonality weights are then determined for each unique 2-gram by dividing the sum of the weights across all references for each 2-gram by the total number of reference documents. For example, the commonality weight for the 2-gram NE is (0.095+0.045)/2=0.070 whereas the commonality weight for the 2-gram NA is (0.095+0)/2=0.048. The 2-gram NA has a weight of 0.095 in the Greenlandic reference while it has a weight of 0 in the Hawaiian reference because it does not appear in the Hawaiian reference.

The commonality weight represents the average contribution of a particular 2-gram to each of the reference documents. This commonality is removed from both the reference documents and the unidentified document in order to better distinguish one document from another. Commonality is removed from the weight of a 2-gram within a document by subtracting the commonality weight from the weight of the corresponding 2-gram in that document. For example, the commonality-removed weight of the 2-gram NE in the Greenlandic reference document is 0.095−0.070=0.025. The commonality-removed weight of the 2-gram NE in the Hawaiian reference document is 0.045−0.070=−0.025. The step of removing commonality improves performance and simplifies the process of identifying documents.

FIG. 5 also lists the commonality weight of each unique 2-gram across the reference documents. These commonality weights are then removed from the corresponding 2-gram weight in each reference document and from the unidentified document. FIG. 6 lists the commonality-removed weights for the unique 2-grams in Greenlandic while FIG. 7 lists the commonality-removed weights for the unique 2-grams in Hawaiian. The commonality-removed weights of a particular reference document are then used to calculate a similarity score for the reference document with respect to an unidentified document.

FIG. 8 shows an example of text written in an unidentified language (i.e., "Martsime nanut"). The unidentified text must be parsed into the same n-gram structure as the reference documents (i.e., 2-grams). Once again, in order to reduce the number of possible 2-grams, the small letters will be capitalized and multiple spaces will be reduced to a single space. The unidentified document thus becomes "MARTSIME_NANUT".

The total number of unique 2-grams in the unidentified document, as listed in FIG. 8 are MA, AR, RT, TS, SI, IM, ME, E_, _N, NA, AN, NU, UT. A weight is assigned to each 2-gram. Once again, the weight of a 2-gram is determined by dividing the frequency of occurrence of that 2-gram by the total number of 2-grams present in the unidentified text (e.g., the weight of MA in the unidentified text is 1/13=0.077). The commonality weights of the reference documents are then subtracted from the corresponding 2-grams in the unidentified documents (see FIG. 8).

In FIG. 9, a similarity score is calculated for the unidentified text with respect to the Greenlandic reference document. The equation for this calculation is as follows:

$$\text{score} = \frac{\sum_{i=1}^{n} (Ui \times Ri)}{\sqrt{\sum_{i=1}^{n} Ui^2 \times \sum_{i=1}^{n} Ri^2}}$$

where Ui represents the commonality-removed weight of a 2-gram within the unidentified text and Ri represents the commonality-removed weight of the corresponding 2-gram within the Greenlandic reference document which is being compared against the unidentified document.

Each commonality-removed weight of the 2-grams in the unidentified text is multiplied by its corresponding commonality-removed weight in the Greenlandic reference document. Each commonality-removed n-gram weight in the Greenlandic reference document is then squared. These squared terms are then summed. Each commonality-removed n-gram weight in the unidentified document is then squared. These squared terms are then summed. These sums are multiplied together to form a "product of summations".

Finally, the score of the unidentified document with respect to the Greenlandic reference document is the "summation of products" divided by the square root of the "product of summations". The result as seen in FIG. 9 is a score that indicates the similarity between the unidentified text and the Greenlandic reference document.

A similarity score is generated for each reference document. The document can either be identified as being similar to the reference document that generated the highest score or similar to the reference document that generated a score that exceeds a user-defined threshold. In the latter approach, an identification is not forced (i.e., the unidentified document may not be identified as being similar to one of the reference documents). Also, with the latter approach, the unidentified document may be identified as being similar to a number of reference documents if these reference documents generate a score that exceeds the user-defined threshold.

Certain text strings in a particular language, such as "is", "the", "and", "with", "for" etc. in English, useful for language identification, are normally useless for topic identification. The present invention solves the problem of finding distinctions among documents with respect to topic by removing the commonality among documents.

Removing commonality among documents entails calculating the average for each n-gram frequency of occurrence within all of the documents and then subtracting these averages from each corresponding n-gram frequency of occurrence within each document. The removal of commonality makes the job of determining if a document is similar to another document simpler. Sensitivity to topic is achieved with no human intervention, irrespective of the language of the document. The user can again set the threshold for determining when documents are similar to each other with respect to topic.

This algorithm works equally well in any language but topic identification only works when comparing documents that are written in a common language (or several closely related languages). This is because the topic is related to the pattern created by the n-grams. The pattern created by the n-grams is controlled by the language of the document.

Topic identification can be done as easily in languages that have relatively few letters, such as English, as in languages that have many characters, such as ideographic languages (e.g., Japanese). While not wishing to be bound by theory, it is believed that the advantageous results of the present invention are obtained because the topic of a document constrains the n-grams used to discuss the topic. Topic identification then becomes a determination of how similar the documents are with respect to the n-grams used.

Figure 10:
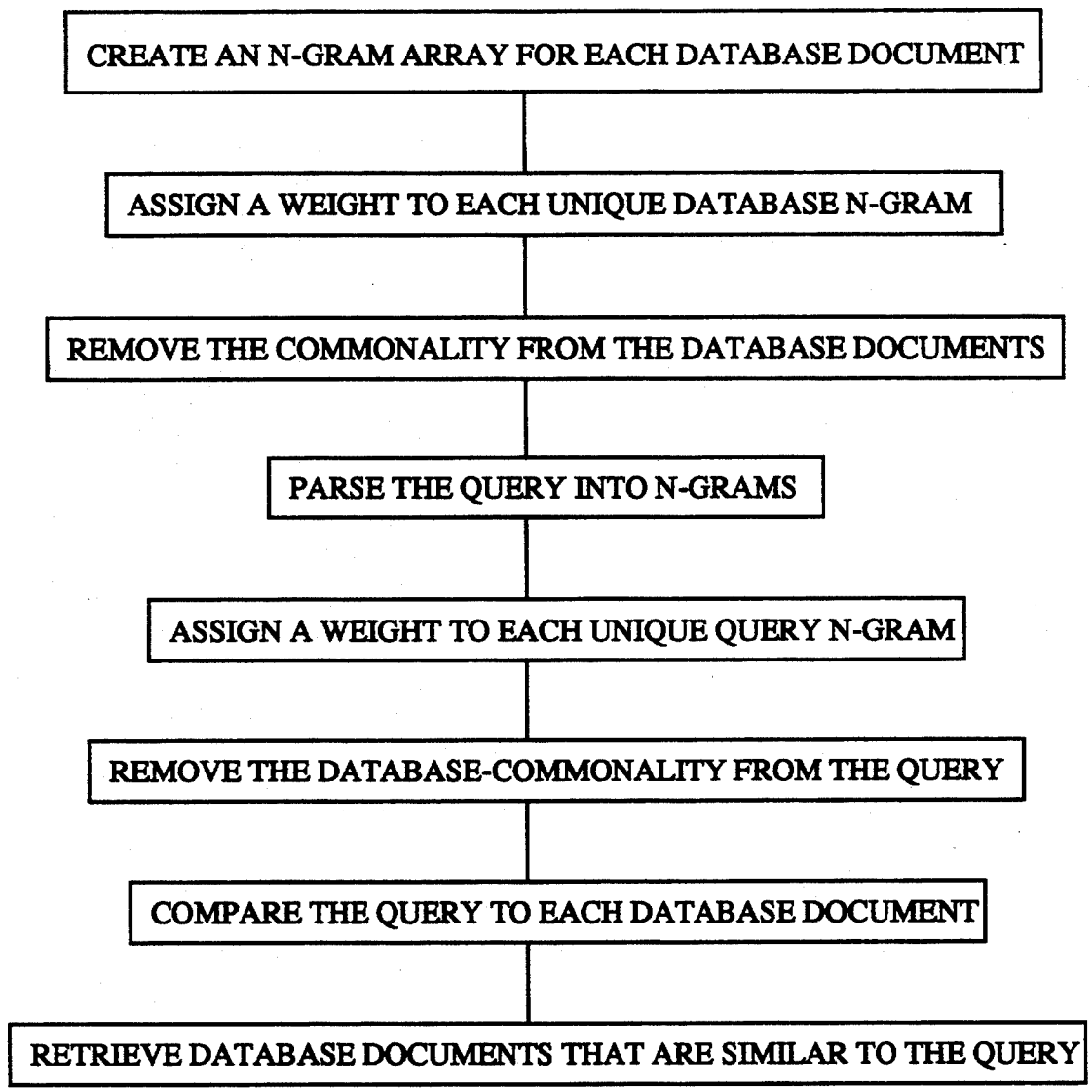
FIG. 10 is a flow chart of the retrieval algorithm by language, and topic.

FIG. 10 outlines the algorithm that is used to retrieve documents from a database. The documents can be retrieved with respect to a desired language or topic.

A database typically contains numerous documents concerning many topics that are written in different languages. There is no requirement that these documents be in any particular form. An n-gram array is created for each database document. This is accomplished by making a list, for each database document, of the unique n-grams that occur in that document. Weights are assigned to each unique n-gram. The weight is determined by the frequency of occurrence of an n-gram in a particular document (i.e., the number of times that an n-gram occurs in a particular document divided by the aggregate total of all n-gram occurrences within that document). Weights are then assigned to each n-gram in each database document.

The commonality among the database documents is then removed from the database documents and the query. This is accomplished by first listing all the unique n-grams within all of the documents. Second, a commonality weight is assigned to each unique n-gram based on its mean relative frequency of occurrence. The commonality weight for each n-gram is then subtracted from the weight of its corresponding n-gram within each database document and from the weight of its corresponding n-gram within the query.

The query is submitted by the user. The query represents the type of document that the user wishes to retrieve from the database (i.e., documents with a similar topic or language). There is no requirement on the form that the query must take.

Note that a query concerning a topic of interest will result in documents retrieved on that topic that are written in the language of the query. Documents on that topic that are written in a language that is different from the query will normally not be retrieved. This is because different languages typically use different n-grams to represent the same topic.

The query is then parsed into n-grams. This is accomplished by making a list of all the unique n-grams that occur in the query. Weights are assigned to each unique n-gram within the query. The weight is determined by the frequency of occurrence of that n-gram within the query. The commonality weights are then subtracted from the corresponding 2-grams within the query. The query is then compared to each of the database documents by scoring the query against each of the database documents.

The score is obtained by first multiplying each commonality-removed n-gram weight of the query (e.g., Qi) by the commonality-removed weight of its corresponding n-gram in a particular database document (e.g., Di). These products are then summed (i.e., "summation of products").

$$\text{summation of products} = \sum_{i=1}^{n} (Qi \times Di)$$

Each n-gram in the database document is then squared (e.g., Di2). These squared terms are then summed. Each n-gram in the query is then squared (e.g., Qi2). These squared terms are then summed. These sums are then multiplied together to form a "product of summations".

$$\text{product of summations} = \sum_{i=1}^{n} Qi^2 \times \sum_{i=1}^{n} Di^2$$

Finally, the score of the database document with respect to the query is the "summation of products" divided by the square root of the "product of the summations".

$$\text{score} = \frac{\sum_{i=1}^{n} (Qi \times Di)}{\sqrt{\sum_{i=1}^{n} Qi^2 \times \sum_{i=1}^{n} Di^2}}$$

A score is generated for each database document with respect to the query. The user defines the threshold score that is used to determine whether a database document is similar to the query with respect to language or topic.

The examples given above concerning the steps involved in language identification are applicable for describing the steps involved in this algorithm for retrieving documents from a database.

N-grams can also be used for solving the problems associated with sorting database documents into categories containing like documents. The algorithm of the present invention does not require any guidance from the user or any preprocessing of the database beyond that described above. The database can be sorted into categories of language or topic. Documents can easily be cross-referenced into different categories (i.e., one document may be sorted into a particular language category as well as a particular topic category).

Figure 11:
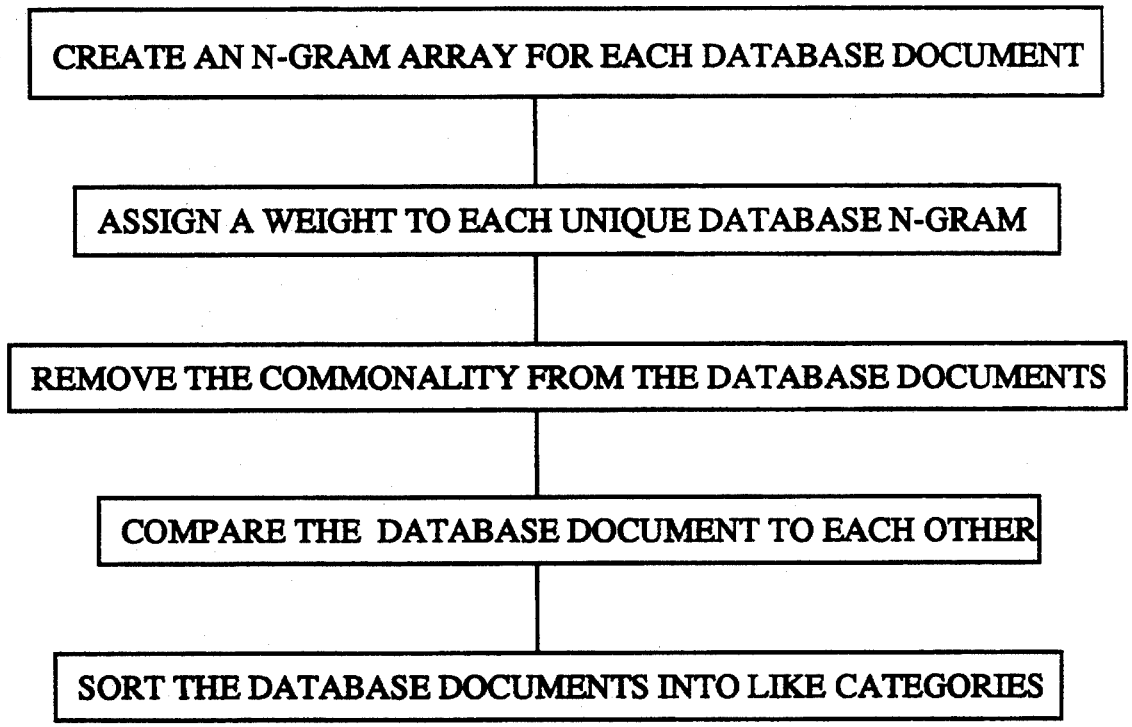
FIG. 11 is a flow chart of the database sorting algorithm by language, and topic.

FIG. 11 outlines the algorithm that is used to sort database documents into categories. The documents can be sorted with respect to a language or topic. A database typically contains numerous documents. These documents may deal with different topics and may be written in different languages. There is no requirement that these documents be in any particular form.

An n-gram array is created for each database document. This is accomplished by making a separate list, for each database document, of the unique n-grams that occur in that document. Weights are assigned to each unique n-gram. The weight is determined by the frequency of occurrence of that n-gram in that particular document. Weights are then assigned to each n-gram in each database document.

The commonality among the database documents is then removed from each database document. This is accomplished by first listing the unique n-grams that occur in the documents (i.e., temporarily thinking of the separate database documents as one large document, then listing the unique n-grams that occur in this one document). Second, a commonality weight is assigned to each n-gram based on the frequency of occurrence (i.e., the total number of occurrences in all of the database documents of that particular n-gram divided by the total number of unique n-grams within all of the database documents). Each commonality weight is divided by the total number of database documents. The commonality weight of each n-gram is then subtracted from the weight of its corresponding n-gram within each database document.

Each database document is then compared to each of the other database documents. This is accomplished by scoring each database document against each of the other database documents. The score consists of first multiplying each commonality-removed n-gram weight from a database document (e.g., D1i) by its corresponding commonality-removed n-gram weight from the database document that is being compared (e.g., D2i). These products are then summed to form a "summation of products".

$$\text{summation of products} = \sum_{i=1}^{n} (D_{1i} \times D_{2i})$$

Each commonality-removed n-gram weight in the first database document is then squared (e.g., D1i2). These squared terms are summed. Each commonality-removed n-gram weight in the second database document, which is being compared to the first database document, is then squared (e.g., D2i2). These squared terms are summed. These sums are then multiplied together to form a "product of summations".

$$\text{product of summations} = \sum_{i=1}^{n} D_{1i}^2 \times \sum_{i=1}^{n} D_{2i}^2$$

Finally, the score of the first database document with respect to the second database document is the "summation of products" divided by the square root of the "product of summations".

$$\text{score} = \frac{\sum_{i=1}^{n} (D_{1i} \times D_{2i})}{\sqrt{\sum_{i=1}^{n} D_{1i}^2 \times \sum_{i=1}^{n} D_{2i}^2}}$$

A score is generated for each database document with respect to each of the other database documents. The user defines the threshold that the score must attain in order for two documents being compared to be declared similar. Similar documents are then sorted into like categories with respect to language or topic.

The examples given above concerning the steps involved in language identification are applicable for describing the steps involved in this algorithm for sorting database documents.

Present research activities in text processing have focused on content-based (i.e., linguistic) analysis. The present invention has focused solely on a pattern recognition (i.e., non-linguistic) analysis. The present invention does not require any additional information pertaining to syntax, semantics or grammar. The benefits of applying n-gram analysis to topic identification have not been fully appreciated until now.

The topic identification method of the present invention operates in any language with equal ease (but in only one language at a time). It can be initiated by a non-reader of the text language and requires no special training. The method is robust in the presence of garbled text (i.e., text that contains errors). The user sets the threshold for determining if documents are similar. Uninformative commonality is automatically removed from the documents.

Changes and modifications in the specifically described embodiments, especially in the programming language used to implement this invention and the specific formula for the similarity score derived from the n-gram weights, can be carried out without departing from the scope of the invention which is intended to be limited only by the scope of the appended claims.

What is claimed is:

1. A method of retrieving at least one document that concerns the same topic as a sample of text by comparing the at least one document to the sample of text, comprising the steps of:
    a) constructing a first list of unique character groupings that occur in one of the at least one document for each of the at least one document;
    b) constructing a second list of unique character groupings that occur in the sample of text;
    c) assigning a first numerical value to each unique character grouping on each first list, where the first numerical value assigned to one of the unique character groupings is equal to the number of occurrences of the unique character grouping within the document divided by the total number of character groupings within the document;
    d) assigning a second numerical value to each unique character grouping on the second list, where the second numerical value assigned to one of the unique character groupings is equal to the number of occurrences of the unique character grouping within the sample of text divided by the total number of character groupings within the sample of text;
    e) constructing a third list of unique character groupings that occur in the at least one document and the sample of text;
    f) assigning a third numerical value to each unique character grouping on the third list, where the third numerical value assigned to one of the unique character groupings is equal to the sum of the first numerical values of the unique character grouping from all of the first lists divided by the total number of first lists;
    g) replacing each first numerical value on each first list with a corresponding fourth numerical value, where the fourth numerical value for one of the unique character groupings is equal to the first numerical value of the unique character grouping minus the corresponding third numerical value for the unique character grouping;

h) replacing each second numerical value on the second list with a corresponding fifth numerical value, where the fifth numerical value for one of the unique character groupings is equal to the second numerical value of the unique character grouping minus the corresponding third numerical value for the unique character grouping;

i) calculating a score for each at least one document with respect to the sample text, where said score is the summation of the products of the fifth numerical values times the corresponding fourth numerical values divided by the square root of the products of the summation of the squares of the fifth numerical values times the summation of the squares of the corresponding fourth numerical values; and j) retrieving the documents from the at least one document that obtained a calculated score in the previous step that is above a user-definable score, where each retrieved document is deemed to concern the same topic as the sample of text.

2. The method of claim 1, wherein said step of constructing a first list of unique character groupings comprises constructing a first list of unique character groupings where each character grouping is a group of consecutive characters of the same length, where the length is any positive integer, where each successive character grouping begins at a character position that is one character position away from the beginning of the immediately preceding character grouping.

3. The method of claim 1, wherein said step of constructing a second list of unique character groupings comprises constructing a second list of unique character groupings where each character grouping is a group of consecutive characters of the same length, where the length is any positive integer, where each successive character grouping begins at a character position that is one character position away from the beginning of the immediately preceding character grouping.

4. The method of claim 1, further comprising the step of replacing the small letters in the sample text and the at least one document with corresponding capital letters.

5. The method of claim 1, further comprising the step of discarding the punctuation marks in the sample text and the at least one document.

6. The method of claim 1, further comprising the step of removing multiple spaces in the sample text and the at least one document.

7. The method of claim 2, wherein said step of constructing a second list of unique character groupings comprises constructing a second list of unique character groupings where each character grouping is a group of consecutive characters of the same length, where the length is any positive integer, where each successive character grouping begins at a character position that is one character position away from the beginning of the immediately preceding character grouping.

8. The method of claim 7, further comprising the step of replacing the small letters in the sample text and the at least one document with corresponding capital letters.

9. The method of claim 8, further comprising the step of discarding the punctuation marks in the sample text and the at least one document.

10. The method of claim 9, further comprising the step of removing multiple spaces in the sample text and the at least one document.

* * * * *